July 15, 1952 M. L. SALISBURY 2,603,681

PRINTED CIRCUIT PANEL WITH CONNECTOR

Filed Dec. 15, 1948

INVENTOR.
MACK L. SALISBURY
BY George H Fisher
ATTORNEY

Patented July 15, 1952 2,603,681

UNITED STATES PATENT OFFICE 2,603,681

PRINTED CIRCUIT PANEL WITH CONNECTOR

Mack L. Salisbury, Minneapolis, Minn., assignor to Minneapolis-Honeywell Regulator Company, Minneapolis, Minn., a corporation of Delaware Application December 15, 1948, Serial No. 65,385

5 Claims. (Cl. 173—324)

Figure 1:
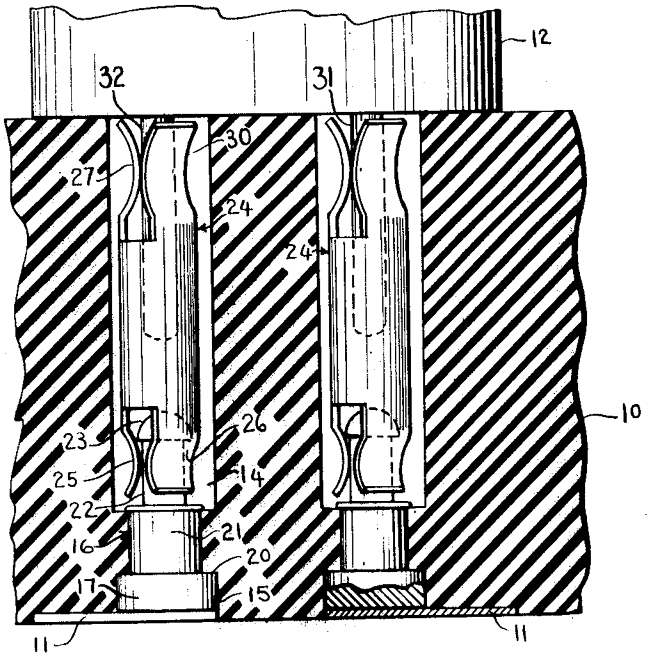

This invention relates to printed circuit connections and particularly to a type of connection which will not place a stress upon the printed circuit in such a manner as to tend to break off a portion of the circuit.

In the past few years printed circuits have been used more and more widely because of their ease and economy of manufacture and compactness with respect to the usual type of wiring circuits. A disadvantage of the use of printed circuits up to now has been the difficulty of connecting into the circuit parts which might have to be removed at a later date because of faults which might arise.

C. Brunetti and R. W. Curtis in a circular on "Printed Circuit Techniques" put out by the National Bureau of Standards define a circuit as being printed when it is produced on an insulating surface and consider them as falling into the six main classifications of (1) painting, (2) spraying, (3) chemical deposition, (4) vacuum processes, (5) die-stamping, and (6) dusting. The reason for depositing these types of circuits on a panel is that the circuit conductors are too delicate to support their own weight. Thus, any stress which is placed upon any of the conductors tending to force it away from the panel would be likely to cause it to break off and destroy the circuit. As a result, any connection which is made to the circuit must be such as to press the conductor toward the panel or it must be a bonded connection, that is, a connection made by molecular cohesion.

In the previous art connections between printed circuits and electron tube prongs were, to the best of applicant's knowledge, made in either of two ways. In one type of connection a bonded connection was used and in this case the printed circuit was usually printed right on the envelope of the tube. When the tube went bad it was necessary to throw away the entire circuit, which was a very wasteful and expensive procedure. In the other type of connection the printed circuit was bonded to a post which was connected to the tube prong by means of a wire lead having its extremities soldered to the post and the prong. When the tube went bad it was necessary to unsolder the lead from the old tube and resolder it to the new tube. Because of the time consumed this procedure was also unsatisfactory.

It is therefore an object of this invention to provide means for easy removal and replacement of faulty units in a printed circuit.

Another object of this invention is to provide means for preventing the insertion of units from placing any stress upon the printed circuit.

Another object of this invention is to provide means whereby electron tubes may be easily inserted into the circuit despite a slight misalignment of electron tube prongs.

These objects are accomplished by the use of a separate connection for each tube prong, each connector being composed of two separate parts. A first part is a pin and is fixed firmly into a panel containing a printed circuit in an aperture provided for the purpose at the place where it is desired to make the connection. The printed circuit is then placed upon the panel and makes a permanent connection with the pin. The other end of this pin has an enlarged rounded portion. The second part of the connector is shaped into a resilient sleeve and is bent inwardly and then outwardly at the ends to obtain a greater clamping pressure than would be the case were it to remain straight. One end of the sleeve is extended over the rounded portion of the first part and is considered to be in a semi-permanent connection therewith. The two parts have a restricted universal relative movement. The tube prongs are then inserted, making a quick-disconnect type of connection. In case of slight prong misalignment on the tube the sleeve will move and permit easy insertion of the prong. The tube prong makes no direct contact with the fixed connector part or with the printed circuit and so cannot place any stress upon the circuit.

Figure 2:
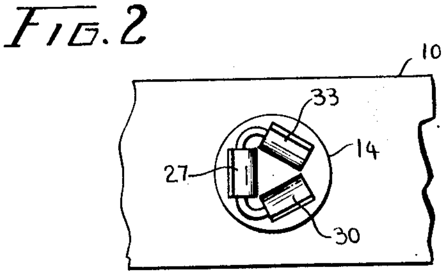

Of the drawings;

Figure 1 is a cross-sectional view of a printed circuit panel showing two connectors enclosing prongs of a tube the top portion of which is cut away, and Figure 2 is a top view of the connector sleeve in the panel.

In the drawings like symbols indicate like components.

In Figure 1 a panel 10 is shown as having portions of a printed circuit 11 to which an electron tube 12 is connected through sleeve and pin connectors to be described hereinafter. At the position in the panel where it is desired to make a connection to a tube electrode a hole is drilled and counterbored at each end 14 and 15.

The pin 16 may be said to be formed of a number of physically unitary cylinders of different diameters. The base 17 of the pin has a diameter which is intended to fit the diameter of the counterbored hole on the side of the panel on which the printed circuit is to be placed. The shoulder 20 of base 17 fits firmly against the bottom of the countersunk hole 15. A cylindrical portion 21 is physically unitary with the base 17 and is of such diameter as to fit snugly into the hole which was bored through the panel. The cylindrical portion 21 extends just beyond the bottom of the countersunk hole 14. A smaller cylindrical portion 22 is physically unitary with cylindrical portion 21. On top of the cylindrical portion 22 is a cap 23 which is shown to be shaped in the form of half a sphere which has a diameter greater than the diameter of cylindrical portion 22.

The pin 16 is affixed permanently to the panel 10. When the pin is placed into the panel an anvil is placed under the base of each pin to hold the pin firmly in the hole while the top portion which extends above the bottom of the countersunk hole 14 is upset to hold the pin firmly in place.

A sleeve 24 is formed by bending a strip of metal such that a cross sectional view of the sleeve appears as a triangle. The open portion of the sleeve is at one of the corners of this triangle. Near the end of the sleeve on each corner a portion of the strip is cut out. This is to enable the sides of the sleeve at the ends thereof to be bent inwardly and then outwardly. Two sides of the bottom of the sleeve 24 are shown to be thus bent inwardly and outwardly as at 25 and 26. This bottom portion of the sleeve 24 is pressed down over the hemi-spherical head 23 of the pin 16 so that the inwardly extending portions 25 and 26, and the inwardly extending portion of the other side which cannot be seen in the drawing, clamp against the cylindrical portion 22 of the pin. This type of connection permits restricted universal movement of the sleeve about the cylindrical portion 22 of the pin 16. The upper end of sleeve 24 is also bent inwardly and then outwardly as shown at 27, 30 and 33.

When the pins 16 are in position in the panel the printed circuit is then placed on the panel with the proper connection being made to the pins. The sleeves are placed on the pin to make the connection above described. When the electron tube is placed into the circuit the prongs 31 and 32, which are the only prongs shown, though it is understood of course that the tube may have more, slide into the sleeves 24 and are held firmly by the inwardly extending portions 27, 30 and 33. If the alignment of the tube prongs 31 and 32 is not exactly correct the sleeves are capable of a small amount of movement in order to accommodate the tube prongs. It is thus seen that in spite of the misalignment which might occur among the tube prongs there is no stress communicated to the printed circuit through the pins.

Because of the hemi-spherical head on the pin 16 the sleeves and the pins are connected together much more securely than are the sleeves and tube prongs and that therefore when an electron tube should go bad it may be easily removed from the sleeve and replaced by a new one without the sleeve 24 being detached from pin 16. Though not shown in any other shapes it is to be understood that the cap 23 is not necessarily hemi-spherical but may be of any shape and size that will permit the lower end of sleeve 24 to be forced over the cap to make a physical connection permitting restricted universal movement of the sleeve and also remained joined despite insertion and withdrawal of a tube prong from the sleeve.

It is understood, of course, that the above description is merely explanatory and does not in any way limit my invention but that rather it is to be limited only to the extent of the appended claims.

I claim as my invention:

1. Apparatus comprising in combination: a panel on which a printed circuit is formed and to which electrical connections from pronged units are to be made, said panel having apertures countersunk at each end; and connecting means for making electrical connections between the printed circuit and the prongs, said connecting means comprising first parts each of which extends through a portion of an aperture in said panel and is permanently held by said panel, each of said first parts having a base portion at one end fitting into one of the countersunk ends of an aperture and to which the printed circuit makes connection, each first part having a portion at the other end extending into the countersunk portion at the second end of the aperture, and second parts positioned in the countersunk portion at the second end of each aperture, one end of each second part being pivotally joined to said first part in a semi-permanent connection, the other end of each second part being adapted to resiliently grasp the prongs.

2. Apparatus comprising in combination: a panel on which a printed circuit is formed and to which electrical connections from pronged units are to be made, said panel having apertures countersunk at each end; and connecting means for making electrical connections between the printed circuit and the prongs, said connecting means comprising first parts each of which extends through a portion of an aperture in said panel and is permanently held by said panel, each of said first parts having a base portion at one end fitting into one of the countersunk ends of an aperture and to which the printed circuit makes connection, each first part having an enlarged portion at the other end extending into the countersunk portion at the second end of the aperture, and second sleeve-like parts positioned in the countersunk portion at the second end of each aperture, each second part having a plurality of resilient inwardly extending fingers at each end, the fingers at one end of each second part grasping one of said first parts such that the enlarged portion on each of said first parts prevents the second part from breaking connection with the first part, and the fingers at the other end of each second part grasping a prong to make releasable electrical connection thereto, the connection between each of said first and second parts being pivotal to accommodate units having prongs out of alignment with the connecting means and not put any stress on the first part.

3. Apparatus comprising in combination: a panel on which a printed circuit is formed and to which electrical connections from pronged units are to be made, said panel having apertures; and connecting means for making electrical connections between the printed circuit and the prongs, said connecting means comprising first parts each of which extends through a portion of an aperture in said panel and is permanently held by said panel entirely within a first end of the aperture, each of said first parts having a base portion at one end to which the printed circuit makes connection, each first part having a portion at the other end of a smaller diameter than the diameter of the portion of the aperture in which said other end of said first part is located, and second parts positioned entirely within the second end of each aperture, one end of each second part being pivotally joined to said other end of said first part and the other end of each second part being adapted to resiliently grasp the prongs.

4. Apparatus comprising in combination: a panel on which a printed circuit is formed and to which electrical connections from pronged units are to be made, said panel having apertures; and connecting means for making electrical connections between the printed circuit and the prongs, said connecting means comprising first parts each of which extends through a portion of an aperture in said panel and is permanently held by said panel entirely within a first end of the aperture, each of said first parts having a base portion at one end to which the printed circuit makes connection, each first part having at its other end an enlarged portion of a smaller diameter than the diameter of the portion of the aperture in which said other end of said first part is located, and second sleeve-like parts positioned entirely within the second end of each aperture, each second part having a plurality of resilient inwardly extending fingers at each end, the fingers at one end of each second part grasping one of said first parts such that the enlarged portion on each of said first parts prevents the second part from breaking connection with the first part, and the fingers at the other end of each second part grasping a prong to make releasable electrical connection thereto, the connection between each of said first and second parts being pivotal to accommodate units having prongs out of alignment with the connecting means and not put any stress on the first part.

5. Apparatus comprising in combination: a panel on which a printed circuit is formed and to which electrical connections from pronged units are to be made, said panel having apertures; and connecting means for making electrical connections between the printed circuit and the prongs, said connecting means comprising first parts each of which extends through a portion of an aperture in said panel and is permanently held by said panel entirely within a first end of the aperture, each of said first parts having a base portion at one end to which the printed circuit makes connection, and second parts positioned entirely within the second end of each aperture, one end of each second part being pivotally joined to said other end of said first part and the other end of each second part being adapted to resiliently grasp the prongs.

MACK L. SALISBURY.

REFERENCES CITED

The following references are of record in the file of this patent:

UNITED STATES PATENTS

| Number | Name | Date |
|---|---|---|
| 2,086,424 | Koehler | July 6, 1937 |
| 2,097,073 | Long | Oct. 26, 1937 |
| 2,123,631 | Koehler | July 12, 1938 |
| 2,380,955 | Eby | Aug. 7, 1945 |
| 2,441,960 | Eisler | May 25, 1948 |
| 2,447,541 | Sabee | Aug. 24, 1948 |

FOREIGN PATENTS

| Number | Country | Date |
|---|---|---|
| 212,817 | Switzerland | Dec. 15, 1940 |
| 686,445 | France | July 25, 1930 |